US011295006B2

(12) United States Patent
Chauvet et al.

(10) Patent No.: US 11,295,006 B2
(45) Date of Patent: *Apr. 5, 2022

(54) PROGRAMMING CODE EXECUTION MANAGEMENT

(71) Applicant: INTERNATIONAL BUSINESS MACHINES CORPORATION, Armonk, NY (US)

(72) Inventors: Philip R. Chauvet, Tucson, AZ (US); Joseph V. Malinowski, Oak Forest, IL (US); David C. Reed, Tucson, AZ (US); Max D. Smith, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/735,444

(22) Filed: Jan. 6, 2020

(65) Prior Publication Data

US 2020/0143039 A1    May 7, 2020

Related U.S. Application Data

(63) Continuation of application No. 15/913,761, filed on Mar. 6, 2018, now Pat. No. 10,565,369, which is a
(Continued)

(51) Int. Cl.
*G06F 21/52* (2013.01)
*G06F 21/44* (2013.01)

(52) U.S. Cl.
CPC .............. *G06F 21/52* (2013.01); *G06F 21/44* (2013.01); *G06F 2221/2139* (2013.01)

(58) Field of Classification Search
CPC ........... G06F 21/52; G06F 21/78; G06F 21/14
See application file for complete search history.

(56) References Cited

U.S. PATENT DOCUMENTS 6,694,360 B1    2/2004  Duguay et al.
7,237,123 B2    6/2007  LeVine et al.
(Continued)

OTHER PUBLICATIONS

J.J. Tucker, "Method and Apparatus at the Physical Layer for Extending Physical Layer Coding in Combination with an Incremental Redundancy (IR) Process", IP.com, IP.com No. IPCOM000205888D, published Apr. 6, 2011, 2010 (c) DOCOMO Communications Laboratories USA, Inc.
(Continued)

*Primary Examiner* — Viral S Lakhia
(74) *Attorney, Agent, or Firm* — Konrad Raynes Davda & Victor LLP

(57) ABSTRACT

In one aspect of the present description, operations are described for detecting whether programming code of a first computer program has been modified by a second computer program. In one embodiment, the modification detecting includes registering a first section of programming code of the first computer program in a first registry data structure. To detect a modification, the registered first section of programming code may be validated. In one embodiment, the validating includes comparing the section of programming code actually located at the first memory address to the registered first section of programming code. In another aspect, various selectable remedial actions may be taken upon detecting modification of programming code of the first computer program. Other features and aspects may be realized, depending upon the particular application.

24 Claims, 9 Drawing Sheets

Related U.S. Application Data continuation of application No. 14/630,854, filed on Feb. 25, 2015, now Pat. No. 9,940,455.

(56) References Cited

U.S. PATENT DOCUMENTS

| | | |
|---|---|---|
| 7,607,171 B1 | 10/2009 | Marsden et al. |
| 7,748,037 B2 | 6/2010 | Rajagopal et al. |
| 7,921,461 B1 | 4/2011 | Golchikov et al. |
| 8,353,033 B1* | 1/2013 | Chen .................. G06F 21/564 726/22 |
| 8,443,354 B1 | 5/2013 | Satish et al. |
| 8,561,176 B1 | 10/2013 | Dalcher |
| 8,819,384 B1 | 8/2014 | Gauba |
| 8,904,189 B1 | 12/2014 | Ghose |
| 9,094,839 B2* | 7/2015 | Shaikh .................. H04W 24/00 |
| 9,129,106 B2 | 9/2015 | Sharif et al. |
| 9,208,314 B1 | 12/2015 | Bhatkar |
| 9,286,109 B1 | 3/2016 | Backensto et al. |
| 9,372,991 B2 | 6/2016 | Kaufinan |
| 9,400,885 B2* | 7/2016 | Tosa ...................... G06F 21/74 |
| 9,430,650 B2* | 8/2016 | Walton .................. G06F 21/60 |
| 9,465,717 B2* | 10/2016 | Delio, Jr. ............. G06F 11/3093 |
| 9,652,376 B2* | 5/2017 | Kuzmin .............. G06F 12/0246 |
| 9,652,613 B1 | 5/2017 | Marsden et al. |
| 9,736,182 B1* | 8/2017 | Madhukar ............. H04L 63/102 |
| 2002/0199100 A1 | 12/2002 | Nenashev |
| 2003/0126458 A1 | 7/2003 | Teramoto et al. |
| 2007/0005992 A1* | 1/2007 | Schluessler ............. H04L 9/004 713/193 |
| 2009/0055693 A1 | 2/2009 | Budko et al. |
| 2009/0138854 A1 | 5/2009 | Mani |
| 2009/0172368 A1 | 7/2009 | Havin et al. |
| 2009/0172814 A1 | 7/2009 | Khosravi et al. |
| 2009/0282393 A1 | 11/2009 | Costa et al. |
| 2009/0313425 A1 | 12/2009 | Futa et al. |
| 2010/0169666 A1 | 7/2010 | Dewan et al. |
| 2010/0192026 A1 | 7/2010 | Abadi et al. |
| 2010/0250870 A1 | 9/2010 | Vick et al. |
| 2010/0306476 A1 | 12/2010 | Giri et al. |
| 2011/0022913 A1 | 1/2011 | Kozakai et al. |
| 2011/0258610 A1 | 10/2011 | Aaraj et al. |
| 2011/0289280 A1 | 11/2011 | Koseki et al. |
| 2012/0054841 A1 | 3/2012 | Schultz et al. |
| 2012/0079596 A1 | 3/2012 | Thomas et al. |
| 2012/0233612 A1 | 9/2012 | Beckett |
| 2012/0304160 A1* | 11/2012 | Soeder .................. G06F 9/4486 717/148 |
| 2014/0068612 A1 | 3/2014 | Torrey |
| 2014/0143865 A1 | 5/2014 | Collard |
| 2014/0295804 A1 | 10/2014 | Naqvi |
| 2014/0365783 A1 | 12/2014 | Michiels et al. |
| 2015/0186296 A1* | 7/2015 | Guidry ................ H04L 63/0876 713/193 |
| 2015/0199516 A1* | 7/2015 | Dalcher ................ G06F 21/554 726/23 |
| 2015/0207812 A1 | 7/2015 | Back et al. |
| 2015/0212742 A1 | 7/2015 | Matsuzawa |
| 2015/0213260 A1* | 7/2015 | Park ........................ G06F 12/14 726/23 |
| 2015/0215335 A1* | 7/2015 | Giuliani ................ G06F 21/554 726/23 |
| 2015/0242626 A1* | 8/2015 | Wang .................... G06F 21/561 726/23 |
| 2016/0048680 A1 | 2/2016 | Lutas et al. |
| 2016/0055337 A1* | 2/2016 | El-Moussa ............ G06F 21/566 726/23 |
| 2016/0094552 A1 | 3/2016 | Durham et al. |
| 2016/0328221 A1* | 11/2016 | Soeder .................. G06F 9/4486 |

OTHER PUBLICATIONS

List of IBM Patents or Patent Applications Treated as Related, pp. 2.
U.S. Appl. No. 14/630,854, filed Feb. 25, 2015.
Office Action dated Aug. 1, 2016, pp. 18, for U.S. Appl. No. 14/630,854, filed Feb. 25, 2015.
Amendment dated Nov. 16, 2016, pp. 15, to Office Action dated Aug. 1, 2016, pp. 18, for U.S. Appl. No. 14/630,854, filed Feb. 25, 2015.
Final Office Action dated Mar. 23, 2017, pp. 16, for U.S. Appl. No. 14/630,854, filed Feb. 25, 2015.
Amendment dated Aug. 23, 2017, pp. 16, to Final Office Action dated Mar. 23, 2017, pp. 16, for U.S. Appl. No. 14/630,854, filed Feb. 25, 2015.
Amendment Sep. 22, 2017, pp. 16, to Final Office Action dated Mar. 23, 2017, pp. 16, for U.S. Appl. No. 14/630,854, filed Feb. 25, 2015.
Notice of Allowance dated Dec. 1, 2017, pp. 8, U.S. Appl. No. 14/630,854, filed Feb. 25, 2015.
U.S. Appl. No. 15/913,761, filed Mar. 6, 2018.
Preliminary Amendment dated 2019-, pp. , U.S. Appl. No. 15/913,761, filed Mar. 6, 2018.
Preliminary Amendment dated 2019-, pp., U.S. Appl. No. 14/630,854, filed Feb. 25, 2015.
Office Action dated Dec. 11, 2018, pp. 24, for U.S. Appl. No. 15/913,761.
Response dated Mar. 11, 2019, pp. 16, to Office Action dated Dec. 11, 2018, pp. 24, for U.S. Appl. No. 15/913,761.
Office Action dated May 30, 2019, pp. 19, for U.S. Appl. No. 15/913,761.
Response dated Aug. 30, 2019, pp. 17, to Office Action dated May 30, 2019, pp. 19, for U.S. Appl. No. 15/913,761.
Notice of Allowance dated Oct. 9, 2019, pp. 44, for U.S. Appl. No. 15/913,761.

* cited by examiner

REGISTRY TABLE 310

| CODE SECTION IDENTIFICATION FIELD 320 || CODE SECTION MEMORY LOCATION FIELD 322 | REMEDIAL ACTION FIELD 324 | MONITOR FIELD 326 | |
|---|---|---|---|---|---|
| PRODUCT KEY SUBFIELD 320a | CODE SEC. KEY SUBFIELD 320b / CODE SEC. LISTING SUBFIELD 320c | | | | |
| PROD. A KEY | C.S. A2 KEY / C.S. A2 LISTING | MEM. LOC. ML2 | HALT | YES | ← 314 |
| PROD. A KEY | C.S. A4 KEY / C.S. A4 LISTING | MEM. LOC. ML4 | RESTORE ORIGINAL | NO | ← 316 |
| PROD. A KEY | C.S. A5 KEY / C.S. A5 LISTING | MEM. LOC. ML5 | LOG MODIFICATION | YES | ← 318 |

FIG. 3A

REGISTRY TABLE 310

| CODE SECTION IDENTIFICATION FIELD 320 | | CODE SECTION MEMORY LOCATION FIELD 322 | REMEDIAL ACTION FIELD 324 | MONITOR FIELD 326 | |
|---|---|---|---|---|---|
| PRODUCT KEY SUBFIELD 320a | CODE SEC. KEY SUBFIELD 320b | CODE SEC. LISTING SUBFIELD 320c | | | |
| PROD. A KEY | C.S. A2 KEY | C.S. A2 LISTING | MEM. LOC. ML2 | HALT | YES | ← 314 |
| PROD. A KEY | C.S. A4 KEY | C.S. A4 LISTING | MEM. LOC. ML4 | RESTORE ORIGINAL | NO | ← 316 |
| PROD. A KEY | C.S. A5 KEY | C.S. A5 LISTING | MEM. LOC. ML5 | LOG MODIFICATION | YES | ← 318 |
| PROD. A KEY | C.S. A5' KEY | C.S. A5' LISTING | MEM. LOC. ML5 | LOG MODIFICATION | YES | ← 340 |

FIG. 3B

PROGRAMMING CODE EXECUTION MANAGEMENT

TECHNICAL FIELD

This description relates in general to a method, system and program product for managing execution of programming code in operating systems, applications and other computer programs.

BACKGROUND

Computer programs for various functions such as payroll, accounts receivable, transaction processing, database management, and other functions may be provided by more than one vendor. Furthermore, any one function such as management of a database, for example, may involve computer programs provided by a variety of vendors. Still further, a particular application such as a database management program, for example, may run on an operating system which is provided by a vendor other the vendors of the database management programs.

It is recognized that software provided by one vendor may affect the manner in which the original code of software provided by another vendor, is executed by the system. For example, a section of programming code of a computer program provided by one vendor, may be altered by a modification or even wholesale substitution of programming code, by a computer program provided by another vendor. As a result, the performance of the original computer program may be affected.

SUMMARY

In one aspect of the present description, operations are described for detecting whether programming code of a first computer program has been modified by a second computer program. In one embodiment, the modification detecting includes registering a first section of programming code of the first computer program in a first registry data structure. In one embodiment, the registering includes entering into a first code section entry of a first data structure associated with the first computer program, an identification of the first section of programming code of the first computer program. In addition, a first memory address at which the first section of programming code is expected to be located may be entered into the first code section entry.

To detect a modification, the registered first section of programming code may be validated. In one embodiment, the validating includes comparing the section of programming code actually located at the first memory address of the entry to the first section of programming code identified by the first code section entry of the first registry data structure. In this manner, it may be determined whether the registered first section of programming code is actually located at the first memory address entered in the first code section entry of the first registry data structure, or whether it has been modified.

In another aspect, various remedial actions may be taken upon detecting modification of programming code of the first computer program. For example, in one embodiment, the data structure may be include a user selectable remedial option for each entry of the first data structure to select the particular remedial action to be taken. Such remedial options may include, for example in one embodiment, logging in a log table an identification of the section of programming code detected to have been modified, halting execution of the first computer program, or restoring the section of programming code detected to have been modified to the baseline version identified by the associated entry of the first data structure.

Other features and aspects may be realized, depending upon the particular application.

BRIEF DESCRIPTION OF THE DRAWINGS

FIGS. 3a-3b illustrate various examples of registry tables utilized by code execution management in accordance with the present description.

DETAILED DESCRIPTION

Figure 1:
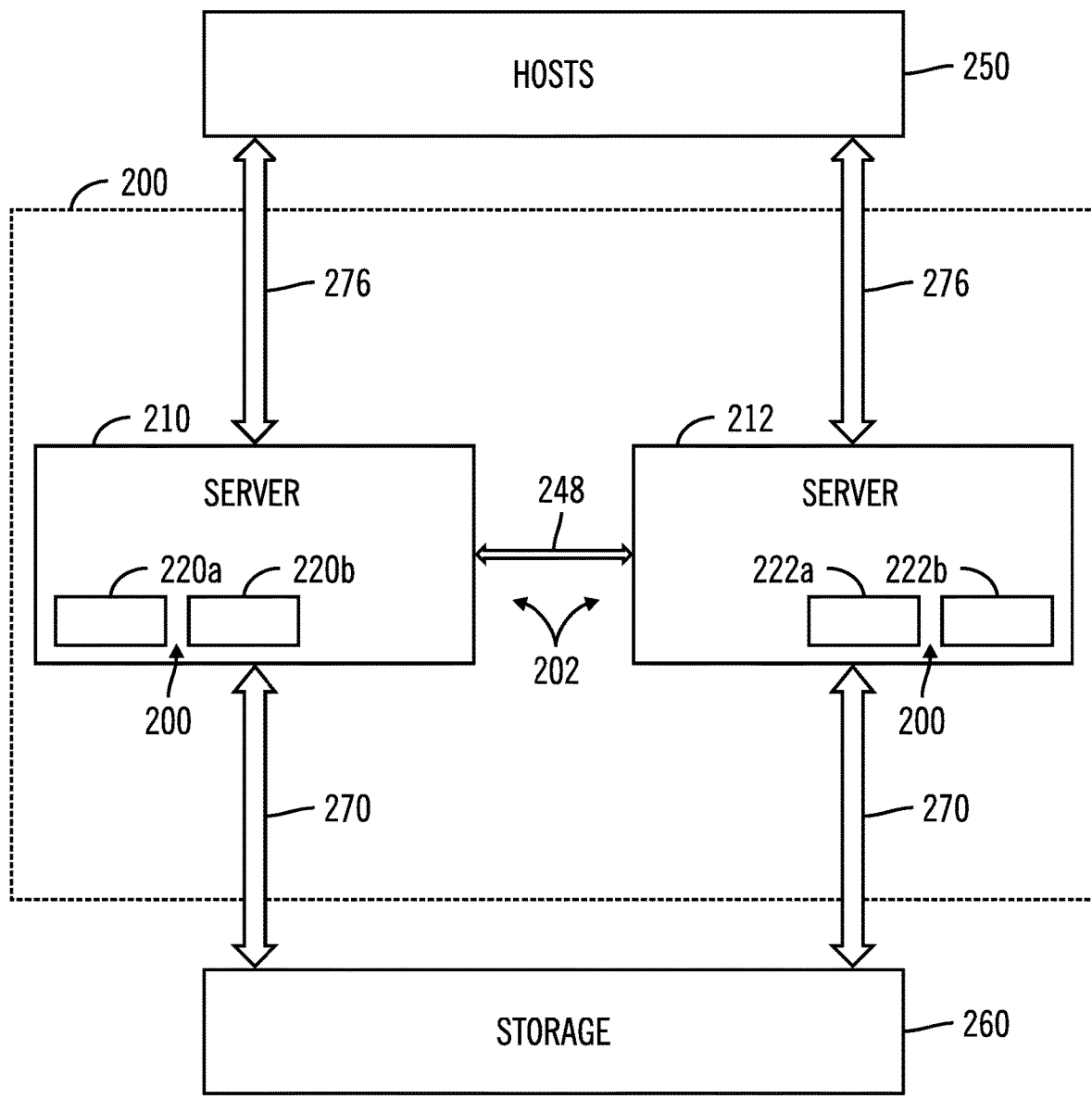
FIG. 1 illustrates an example of a computing system employing code execution management, in accordance with one aspect of the present description.

One example of a computing system incorporating and using aspects of programming code execution management, in accordance with one embodiment of the present description, is a distributed computing system depicted at 200 in FIG. 1 and described herein. A distributed computing system in accordance with one embodiment may include a plurality of processor nodes, which may be provided by various computing devices including clusters, servers, virtual servers, controllers and other programmed or dedicated processors. A primary function of the computing system of this embodiment is to provide a data processing function such as data backup, data retrieval, data deduplication, data mining, data capture, data archiving, data replication, bandwidth reduced data replication, encryption of data etc. It is appreciated that a computing system in accordance with the present description may perform other data processing functions, such as for example, payroll, accounts receivable, transaction processing, database management, and other functions, depending upon the particular application.

In one aspect of the present description, a computer program is provided an associated data structure which includes a registry table to track selected sections of programming code. The registry table, referred to herein as a code section tracking registry table identifies various selected sections of programming code of a particular computer program to be executed by the processor node. As used herein, the term "computer program" refers to a set of instructions which may be executed by a processor to perform one or more functions. A computer program may include an application or an operating system or both the operating system and an application which runs on the operating system. For each selected section of programming code of the computer program, the code section tracking registry table has an entry identifying both the selected section of code and a location in memory in which the selected section of programming code is expected to be loaded. As used herein, a location in memory may be provided by either volatile memory such as short term random-access memory used by a processor to execute programs, or non-volatile memory such as long term storage used to store data and programming code.

As explained in greater detail below, the code section tracking registry table may facilitate validating selected sections of programming code loaded into memory including determining whether one or more of the selected sections of programming code loaded into memory have been modified. In one example, a section of code loaded into a memory location identified by the code section tracking registry table, may be compared to the section of programming code expected to be loaded into the memory location as identified by the entry of the code section tracking registry table.

If the section of programming code which is actually loaded into a memory location identified by the code section tracking registry table, matches the registered section of programming code expected to be loaded into that memory location as identified by the entry of the code section tracking registry table, it may be determined that the original computer program has not been altered, at least with respect to the selected registered section of programming code of the code section tracking registry table entry. Conversely, if the section of programming code found to be actually loaded into a memory location identified by the code section tracking registry table, does not match the registered section of programming code expected to be loaded into that memory location as identified by the entry of the code section tracking registry table, it may be determined that the original computer program has been altered, at least with respect to the selected registered section of programming code of the code section tracking registry table entry.

For example, a software product such as a database management program which originates from one vendor may engage in "hooking" into a software product such as an operating system or storage management program which originates from another vendor. As used herein, the term "hooking" refers to various techniques used to alter the behavior of an operating system, application, program or other software component. One known hooking technique intercepts events such as function calls, messages or events passed between software components such as sections of programming code, to redirect calls, change the location of a module of programming code or load a modified copy of a module into storage to await execution by a processor. Programming code that handles such intercepted events is referred to as a "hook" and can significantly alter the performance, path of code taken, or overall processing as compared to that of the original programming code.

Moreover, these hooks can potentially be several layers deep, where one software product initiates a hook, and is itself hooked by yet another software product at a later time. It is appreciated that diagnosing the behavior of programming code can be made more difficult by such hooking techniques, particularly where hooking is employed at multiple levels to alter the programming code from the original version.

As previously mentioned, a code section tracking registry table in accordance with the present description may facilitate detecting whether one or more selected sections of programming code of one software product loaded into memory, have been modified by a second software product. Moreover, any modifications by each such software product may themselves be provided an associated code section tracking registry table entry in accordance with the present description, which may facilitate detecting whether multiple levels of computer programming code alteration techniques have been employed.

In the example of FIG. 1, the distributed computing system 200 includes a cluster 202 having two servers, a server 210 and a server 212, each of which may include one or more processor nodes 220a, 220b, 222a, 222b which share resources and collaborate with each other in performing system tasks. Although one cluster 202, two servers 210, 212 and four processor nodes 220 are depicted in the illustrated embodiment, it is appreciated that the distributed computing system 200 may have a fewer or a greater number of clusters, servers and processor nodes, depending upon the particular application.

Each server 210, 212 may have one or more central processing units (CPUs) in which the processing, memory and other resources of the server may be apportioned into logical partitions, often referred to as a "virtual server," each of which is capable of running an individual copy of an operating system and performing the service functions of a "server". Thus, as used herein, the term "server" may be used to refer to a physical server or a logical partition or virtual server performing a server function.

Each processor node 220a, 220b, 222a, 222b typically includes a virtual or physical server having processor and memory resources running an individual copy of an operating system. Hence, each processor node 220 is capable of independently performing data processing functions as well as code execution management functions assigned to that processor node.

In the illustrated embodiment, a processor node may have multiple I/O adapters including host and device adapters which are accessed through a switch such as a PCIe switch, for example. To increase efficiency, it is often desirable to share I/O adapters amongst the servers of the cluster. Thus, a device adapter, for example, may be shared as a "virtual" device adapter. The processor nodes typically communicate with the device adapters and other I/O adapters over a "fabric" which may comprise one or more interfaces providing communication paths between the nodes and adapters.

Communication paths 248 interconnect the various processor nodes 220 of the distributed computing system 200. The communication paths 248 may be part of an Ethernet network, for example, such that each processor node 220 has an individual network (internet protocol) address. Other types of networks or other communication paths may be utilized, such as a modem telephone path, wireless network, etc. depending upon the particular application.

The processor nodes of the system store data on one or more virtual volumes of a storage fabric represented by one or more disk storage devices 260. The storage fabric includes suitable communication paths 270 between the storage devices 260 of the storage fabric and the servers 210, 212. The storage fabric may include suitable switches and other fabric devices.

Hosts 250 are coupled to the distributed computing system 200 by communication paths 276 of a network fabric. The network fabric may similarly include suitable switches and other fabric communication devices.

In the illustrated embodiment, the servers 210, 212 provide an interface between the communication paths 276 coupled to the hosts 250, and communication paths 270 between the storage devices 260 of the storage fabric and the servers 210, 212. Thus, the communication paths 276 to the hosts 250 may be based upon a particular host attachment protocol such as FICON, for example, and the communication paths 270 may be based upon the Fibre Channel protocol, for example. It is appreciated that other communication path protocols may be utilized, depending upon the particular application.

The distributed computing system 200 performs data processing functions at each of the plurality of processor nodes 220a, 220b, 220c, 220d. In the illustrated embodiment, the data processing functions include storing data in and retrieving data from the storage 260. It is appreciated that a first software product being executed by a processor node may have been modified by a second software program product, thus altering the manner of operation and performance of the first software product from its original intended operation and performance.

As set forth above, programming code execution management in accordance with one aspect of the present description facilitates detection of modifications of one software product by another software product. In one embodiment, a registry table having a number of entries, is created and stored in storage. Each entry of the registry table keeps track of a particular section of programming code at a specific address. Entries may be added to the registry table at various times such as when the system comes up or when the software product being monitored is started for the first time, for example. The entries may be later checked at various times to detect whether the original or baseline programming code has been modified. If it has, various actions may be taken such as logging an entry to a trace table or dataset, for example.

Figure 2A:
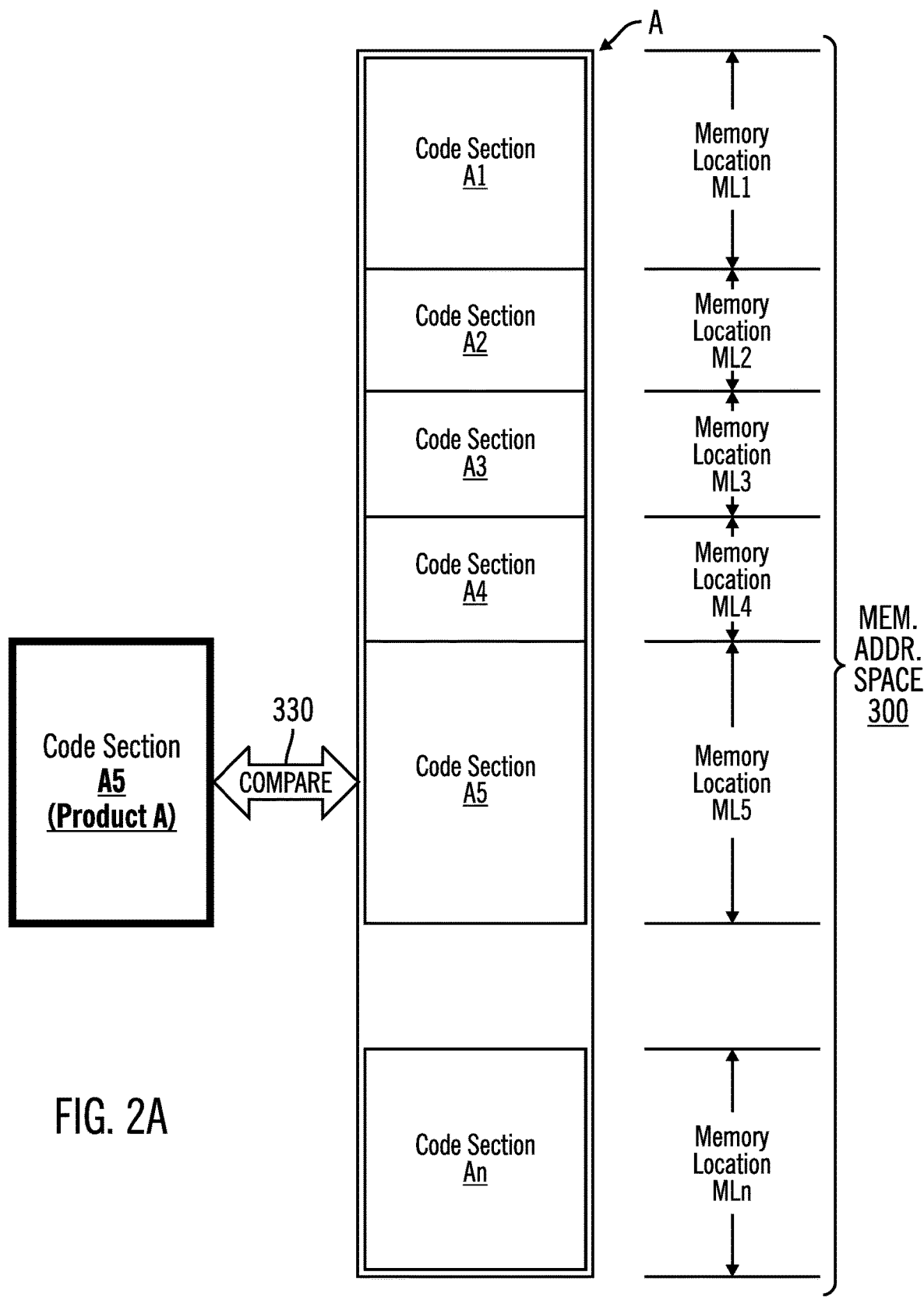
FIGS. 2a-2c illustrate various examples of sections of programming code loaded into memory locations of a memory address space and managed by code execution management in accordance with the present description.

FIG. 2a shows an example of sections of a computer program designated a software product A which is provided in this example by a vendor which is different from that of a second computer program which is designated herein as software product B. In this example, the software product A has a number of sections of programming code, programming code sections A1, A2, . . . An, which are loaded into a memory address space 300 of storage which may be a dedicated or shared storage resource located within a processor node or cluster itself or within the data storage 260 (FIG. 1) for example. Thus, in the example of FIG. 2a, programming code section A1 of software product A is loaded into memory location ML1 of address space 300, programming code section A2 of software product A is loaded into memory location ML2 of address space 300, and so on. The programming code sections A1, A2, . . . An loaded into memory locations ML1, ML2 MLn represent the baseline version of the computer program software product A. As used herein the baseline version of a software product may be the original version as sold by a vendor or as modified in a known or expected manner.

To facilitate detection of unknown or unexpected modifications to the baseline version of software product A by another computer program such the software product B, for example, selected sections of programming code of the software product A of FIG. 2a may be registered in a registry table 310 for software product A as shown in FIG. 3a. Thus, in the example of FIG. 3a, programming code sections A2, A4 and A5 of software product A have been selected and registered in entries 314, 316 and 318, respectively, of the registry table 310 for software product A. As described herein, the sections of programming code may be selected for registry in the registry table for purposes of tracking those sections of programming code to detect modifications to the sections of programming code by one or more other software products.

Although the registry table 310 of FIG. 3a is depicted as having three entries 314, 316, 318 for clarity purposes, it is appreciated that the number of entries of a registry table in accordance with the present description may have fewer or greater number of entries, depending upon the particular application. For example, in many commercial software products having hundreds, thousands or millions of lines of programming code, a registry table as described herein may have tens, hundreds, thousands or more such entries.

The registry table 310 may be created at a suitable point in the operation of the system 200 (FIG. 1). For example, the registry table 310 may be created and the fields of the entries populated with appropriate data when the system 200 comes online, when the baseline version of the software product A is initially installed into the system 200 or when the software product A is first started by the system 200, or early in the execution each time the software product A is run. It is appreciated that the registry table 310 may be created in connection with other events depending upon the particular application. In one embodiment, the registry table is created prior to opportunities for other software products to modify software product A.

Once created, the entries of the registry table 310 may be saved in a data set in storage or other suitable location. In one embodiment, the registry table 310 is preserved notwithstanding that the system software or the software product A is reinstalled or is loaded in a subsequent IPL (initial product load). If it is suspected that the software product A has already been modified by one or more software products before the registry table and its entries have been created, the baseline software product A may be reinstalled and the registry table 310 created prior to opportunities for other software products to modify the baseline software product A.

The particular sections of programming code of software product A which are selected registration in the registry table 310 may selected using a variety of techniques. For example, a number of programming code sections may be automatically selected by default by the software product A, the system 200 or the user, for registration in the registry table 310. In some embodiments, a suitable user interface is provided to provide the user the opportunity to manually select various sections of programming code of the software product A for registration in the registry table 310. It is appreciated that the manner in which programming code sections are selected for registration in the registry table 310 may vary, depending upon the particular application.

The sections of programming code selected for registration may be selected based upon various factors. For example, locations within the programming code at which system services are called, are common hook locations. In the context of storage management, modules for processing end of volumes within an access routine are frequently bypassed with code from another software product. These and other common hook locations may be appropriate for registration in the registry table 310. Additional candidates may include sections of code in which performance of the code appears to have been altered or otherwise departs from the expected performance. As previously mentioned, if it is suspected that the software product A has already been modified by one or more software products, the baseline software product A may be reinstalled and the registry table 310 created prior to opportunities for other software products to modify the baseline software product A. It is appreciated that the particular manner of selecting sections of programming code for registration in the registry table may vary, depending upon the particular application.

In the illustrated embodiment, each entry 314, 316, 318 of the registry table 310 has four fields, 320-326 to enter data for the programming code section registered in the particular entry of the registry table 310. It is appreciated that the number and type of fields of each entry may vary, depending upon the particular application.

In this example, a first field 320 identifies the programming code section which has been registered in the associated entry of the registry table 310. Thus, in the example of FIG. 3*a*, the field 320 of the entry 314 identifies the code section A2 (FIG. 2*a*) of the software product A. In one embodiment, the field 320 may include a subfield 320*a* having a product key or other product identification code which identifies the particular software product such as software product A, from which the baseline code section originates. Similarly, the code section itself may have a key or other code subfield 320*b* to identify the particular programming code section of the software product. Yet another subfield 320*c* may identify a section of programming code by containing a complete copy of the code listing of that section of programming code. Since the size of the sections of programming code of the entries may vary from entry to entry, the size of the fields 320*c* may similarly vary from entry to entry. It is appreciated that other techniques may be used to identify a section of programming code depending upon the particular application. For example, a hash code may be generated to identify a particular section of programming code.

In addition to the code section identification field 320, each entry of the registry table 310 of FIG. 3*a* further has a code section memory location field 322 which identifies the memory address at which the code section identified by the field 320 is expected to be loaded. Thus, in the example of FIG. 3*a*, the field 322 of the entry 314 identifies the memory location ML2 (FIG. 2*a*) of the memory space 300.

In one aspect of the present description, programming code section registered in an entry of the registry table 310 may be validated by comparing the section of programming code loaded at a memory location identified by the code section memory location field 322, to the programming code expected to be found at that memory location as identified by the code section identification field 320. Thus, where the registry table includes a complete listing of the registered section of programming code, a listing of the section of programming code actually located at the memory address may be compared to the listing of the registered section of programming code contained within the code section entry of the registry table to determine whether the listing of the registered section of programming code is actually located at the memory address of the registry table entry.

Thus, if the section of programming code loaded at a memory location identified by the code section memory location field 322, matches the registered section of programming code expected to be found at that memory location as identified by the code section identification field 320, it may be determined by the validation process that the section of programming registered in the registry table 310 has not been modified from the baseline version. Conversely, if the section of programming code loaded at a memory location identified by the code section memory location field 322, fails to match the registered section of programming code expected to be found at that memory location as identified by the code section identification field 320, it may be determined by the validation process that the section of programming registered in the registry table 310 has been modified from the baseline version.

Thus, for example, the section of programming code loaded at the memory location ML5 (FIG. 2*a*) identified by the code section memory location field 322 of the registry table entry 318, may be compared as represented by the arrow 330 to the registered programming code section A5 (FIG. 2*a*) identified by the code section listing subfield 320*c* of the entry 318 and expected to be found at the memory location ML5 as indicated by the entry 318. If the section of programming code loaded at the memory location ML5 (FIG. 2*a*) identified by the code section memory location field 322 of the registry table entry 318, matches the registered programming code section A5 (FIG. 2*a*) identified by the code section listing subfield 320*c* of the entry 318 and expected to be found at the memory location ML5 as indicated by the entry 318, it may be determined that the programming code section A5 registered in the entry 318 of the registry table 310 has not been modified from the baseline version. FIG. 2*a* depicts the programming section A5 as unmodified from the baseline version.

Figure 2B:
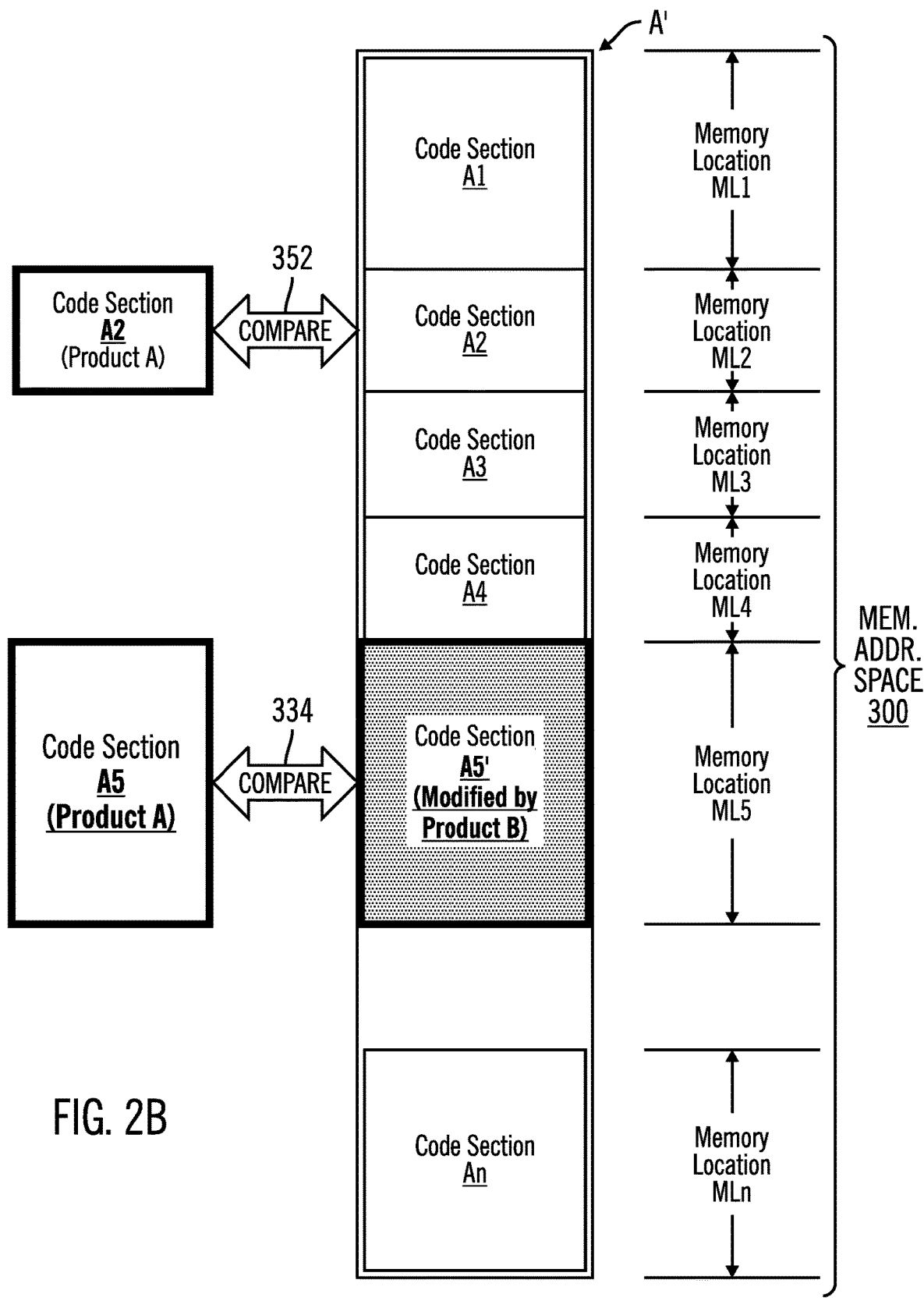

By comparison, FIG. 2*b* depicts the programming section A5 as a modified programming section A5' which has been modified from the baseline version A5 by another software product such as software product B. Accordingly, when the programming code section A5' loaded as shown in the example of FIG. 2*b* at the memory location ML5 identified by the code section memory location field 322 of the registry table entry 314, is compared as represented by the arrow 334 to the programming code section A5 identified by the code section listing subfield 320*c* of the entry 318 and expected to be found at the memory location ML5 as indicated by the entry 318, the programming code section A5' will fail to match the registered programming code section A5 identified by the code section listing subfield 320*c* of the entry 318. Accordingly it may be determined in the example of FIG. 2*b*, that the programming code section A5 (FIG. 2*a*) registered in the entry 318 of the registry table 310 has been modified from the baseline version A5 (FIG. 2*a*) to the modified version A5' (FIG. 2*b*).

The registry table 310 may be used at various times, to determine if the software product A has been modified from the baseline version. The modification check times may be automatically provided as default values and in some embodiments, the user may be provided the option of modifying the program code modification check times from the default values. For example, in some embodiments, the user may select to have the programming code sections registered in the registry table 310 checked during every execution of the software product A, after a certain number of executions, once per day, after a system IPL, randomly, or at other user selected times. The frequency of programming code modification checks may be increased as appropriate for increased monitoring for program modification, or may be decreased as appropriate for reduction in system overhead. In some embodiments, an on-demand command may be made available to the user through which the user may issue to the system at any time a command to perform an on-demand check of any programming code section registered in the registry table and to report if anything has been modified.

In one embodiment, the field 326 may be provided in each entry of the registry table 310 to provide the user the option of selecting whether the programming code section registered in the associated entry is to be checked. Thus, in the example of FIG. 3*a*, the field 326 of the entry 316 indicates that the user has selected to bypass a check of the code section A4 of the entry 316. In this manner, the user may select which programming code sections registered in the registry table 310 are checked each time the registry table 310 is used to check for programming code modifications and which programming code sections registered in the registry table 310 are bypassed and thus not checked each time the registry table 310 is used to check for programming code modifications.

In the illustrated embodiment, the registry table 310 has a further field 324 to identify remedial action to be taken in the event that a modification of a programming code section registered in the registry table has been detected. In this embodiment, several options for remedial action are available. For example, field 324 of table entry 318 indicates that in the event that a modification of programming code A5 at memory location ML5 has been detected to have been modified as represented by programming code section A5' as shown in FIG. 2b, the modified programming section A5' is permitted to execute but the detection of the modification may be logged in an appropriate log record such as the job log provided for executing jobs and the system log record. In addition to the detection of a modification, details concerning the nature and type of the modification such as whether it is a hook type modification may be recorded in the log record as well. In one embodiment, such an option which permits modified programming code to execute but logs the detection of the modification may be provided as a default value for remedial action field 324 of the registry table 310. It is appreciated that other types of action may be provided as default values, depending upon the particular application.

Another option which may be made available to the user is to halt the execution of the programming code in the event that a modification of the programming code is detected. Thus, in the example of FIG. 3a, the remedial action field 324 for the entry 314 indicates that program execution should be halted in the event that modification of programming code section A2 is detected. The detection of the modification and the halting of execution may also be logged in one embodiment.

Yet another option is to restore the original programming code section in the event that a modification of the programming code is detected. The original or baseline programming code section may be restored by removing the modified version detected at the associated memory location and replacing it with the original or baseline version of the programming code section registered for that memory location. Thus, entry 316 of the registry table 310 indicates in the remedial action field 324 that the original programming code section A4 should be restored to the memory location ML4 in the event that a modification of programming code section A4 at memory location ML4 is detected. The restored programming code may, in one embodiment, then be executed. The detection of the modification, restoration of the baseline version and the execution of the restored version may also be logged in one embodiment.

Such original or baseline code restoration may be well suited for modifications in which the modification is essentially a redirection to a different location of programming code. Accordingly by restoring the baseline programming code, the baseline programming code section may still be called and the hook modification essentially bypassed. A programming code restoration is facilitated in those embodiments in which the code section listing subfield 320c contains a full copy of the programming code section registered in the registry table entry. It is appreciated that suitable remedial actions in the event of a modification detection may include various combinations of logging events, restoring baseline versions, permitting modified versions to remain, and halting and permitting execution to proceed, as well as other actions, depending upon the particular application.

In another aspect of the present description, it is recognized that a particular software product may be modified by more than one other software product. As a result, there may be multiple layers of modifications in which a modification by one software product may itself be modified by yet another software product. In accordance with the present description, such multiple layers of modifications may also be detected and appropriate remedial actions taken.

For example, FIG. 2b shows the software product A having been modified by a second software product such as software product B, for example. Thus, programming code section A5 (FIG. 2a) at memory location ML5 has been modified as represented by the programming code section A5' by software product B as shown in FIG. 2b. The programming code section A5' may itself be modified by yet another software product such as a software product C, for example. Thus, FIG. 2c depicts the programming code section A5' of FIG. 2b as having been modified by a third software product, software product C, as presented by the programming code section A5" at memory location ML5 in FIG. 2c.

To detect additional layers of modifications, the programming code sections modified by a software product may themselves be registered in the registry table 310 for software product A. Thus, in the example of FIG. 2b, the modified programming section A5' may itself be registered in the registry table 310 as shown by added entry 340 in FIG. 3b.

Thus, for example, if the section of programming code loaded at the memory location ML5 (FIG. 2a) identified by the code section memory location field 322 of the registry table entry 340, matches the registered programming code section A5' (FIG. 2b) identified by the code section listing subfield 320c of the entry 340 and expected to be found at the memory location ML5 as indicated by the entry 340, it may be determined that the programming code section A5' registered in the entry 340 of the registry table 310 has not been modified from a second baseline version which is the modified version of FIG. 2b.

Figure 2C:
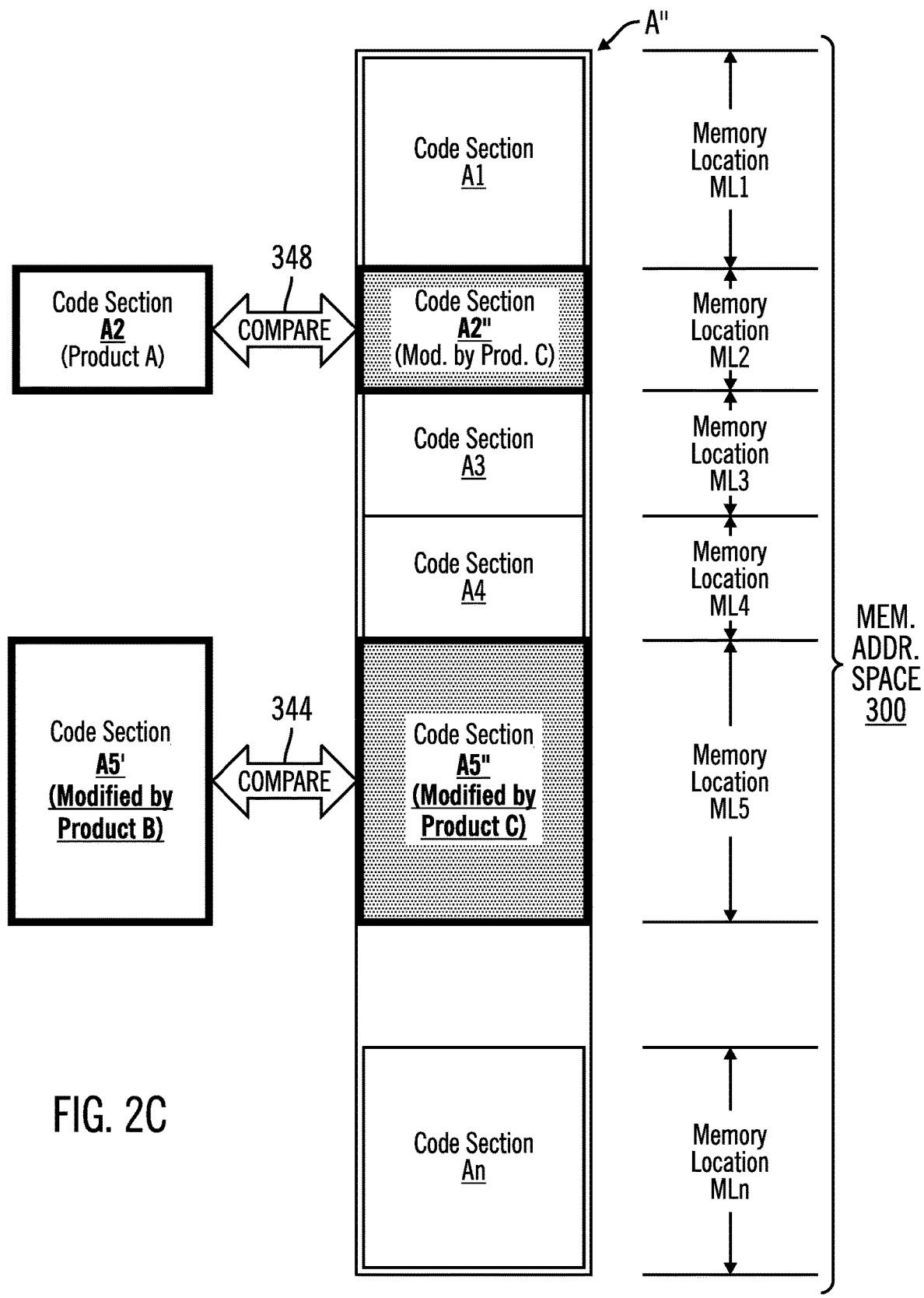

By comparison, FIG. 2c depicts the programming section A5' as having been modified to the modified programming section A5" which has been modified from the second baseline version A5' by another software product such as software product C. Accordingly, when the programming code section A5" loaded as shown in the example of FIG. 2c at the memory location ML5 identified by the code section memory location field 322 of the registry table entry 340, is compared as represented by the arrow 344 to the programming code section A5' identified by the code section listing subfield 320c of the entry 340 and expected to be found at the memory location ML5 as indicated by the entry 340, the programming code section A5" will fail to match the registered programming code section A5' identified by the code section listing subfield 320c of the entry 340. Accordingly it may be determined in the example of FIG. 2c, that the modified programming code section A5' (FIG. 2b) registered in the entry 340 of the registry table 310 has itself been modified from the second baseline version A5' (FIG. 2b) to the further modified version A5" (FIG. 2c). Upon detection of this modification, the twice modified programming code section A5" is permitted to execute and an appropriate entry is made to a log as indicated by the remedial action field 324 of the registry table 340

In one embodiment, when a registry entry is added to the registry table for the same memory location, the preexisting registry entry for that memory location may be retained. Thus, in the example of FIG. 3b, the registry table entry 318 for the memory location ML5 is retained in addition to the registry entry 340 for the same memory location ML5. Accordingly, if a check of the programming code of software product A is made in response to the registry table entry 318 as indicated by the monitor field 326 of the entry 318, the check at memory location ML5 of entry 318 will also indicate that the code section A5 of entry 318 and expected to be loaded at memory location ML5 has been modified. In the example of FIG. 2c, the code section at memory location ML5 was modified to code section A5" as discussed above.

By retaining both registry table entries 318 and 340 for the same memory location ML5, detection of multiple levels of programming code modifications may be further facilitated. For example, if another software product or the user restores the programming code section at memory location ML5 to the original baseline version A5, a check of the programming code of software product A in response to the registry table entry 318 could confirm that the programming code section at memory location ML5 has in fact been restored to the original baseline version A5. Similarly, a check of the programming code of software product A in response to the registry table entry 340 could confirm that the programming code section at memory location ML5 has in fact been modified from the second baseline version A5'.

In another embodiment, when a registry entry is added to the registry table for the same memory location, the preexisting registry entry for that memory location may be removed. Alternatively, when a registry entry is added to the registry table for the same memory location, the monitor field 326 of the preexisting registry entry for that memory location may be changed to indicate no check is to be performed for the associated memory location. Thus, in the example of FIG. 3b, the registry table entry 318 may be removed from the registry table 310 or the monitor field 326 may be modified to indicate a "NO" so that the memory location ML5 is checked only in connection with the registry table entry 340.

In the example of FIG. 2c, the programming code section A2 (FIG. 2a) at memory location ML2, has been modified from the original baseline A2 represented in FIG. 2a to the modified programming code as represented by the programming code section A2" in FIG. 2c. Such a modification of the programming code at memory location ML2 would be detected upon a check (as represented by the arrow 348) of the programming code of software product A at memory location ML2 in response to the registry table entry 314 of FIG. 3b.

By comparison, in the example of FIG. 2b, the programming code section A2 (FIG. 2a) at memory location ML2, was earlier found not to have been modified as represented by the unchanged programming code section A2 in FIG. 2b. The lack of such a modification of the programming code at memory location ML2 was detected upon a check (as represented by the arrow 352, FIG. 2b) of the programming code of software product A at memory location ML2 in response to the registry table entry 314 of FIG. 3a. Because the programming code at memory location ML2 was found not to have been modified in response to the registry table entry 314 of FIG. 3a but was subsequently found to have been modified in response to the registry table entry 314 of FIG. 3b, an indication is provided that software product A was not modified at memory location ML2 by the software product B as shown in FIG. 2b, but was subsequently modified at memory location ML2 by the software product C as shown in FIG. 2c. In this manner, by performing multiple checks of the programming code at the same memory location using the registry table 310 at different times, detection of multiple levels of programming code modifications may be facilitated.

Figure 4:
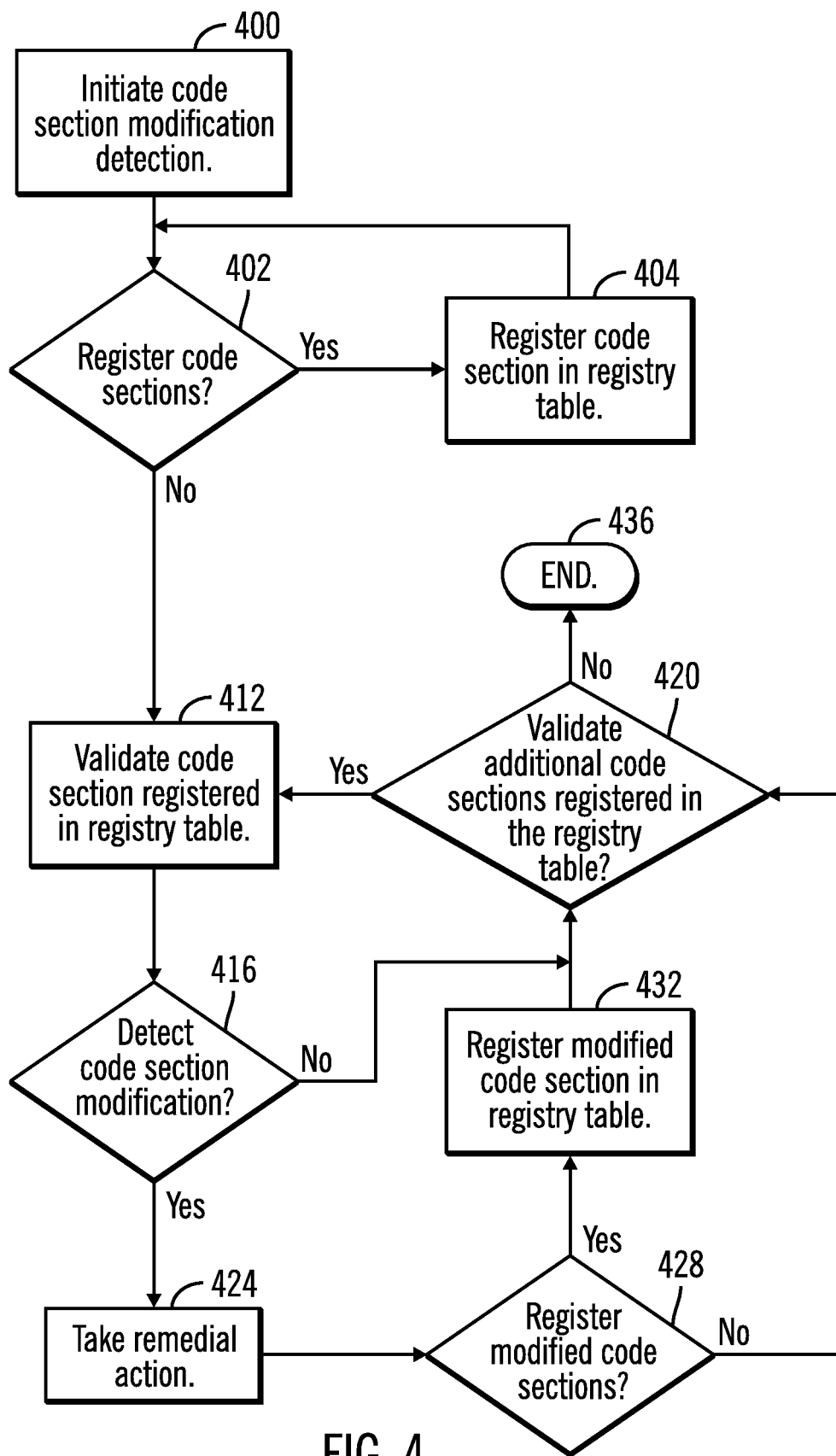
FIG. 4 depicts an example of operations of a processor node for code execution management in accordance with one aspect of the present description.

FIG. 4 depicts one example of operations for programming code execution management in accordance with one embodiment of the present description. In one operation, detection of programming code section modification for a software product is initiated (block 400). In one aspect of the present description, detecting whether programming code of one software product has been modified by another software product, includes determining (block 402) whether to register (block 404) a section of programming code of the software product in a registry data structure such as the registry table 310 of FIG. 3a, for example.

As previously mentioned, the registry table may be created at any suitable point in the operation of the system such as, for example, when the system comes online, when the baseline version of the software product to be monitored is initially installed into the system, when the software product to be monitored is first started by the system, or early in the execution each time the software product being monitored is run. In one embodiment, the registry table is created prior to opportunities for other software products to modify the software product being monitored.

In the illustrated embodiment, a section of programming code is registered in the registry table by creating an entry for that section of programming code and entering appropriate data in the fields of the entry for that section of programming code. For example, in the registry table 310 (FIG. 3a), each entry 314, 316, 318 of the registry table 310 has a code section identification field 320 which identifies the programming code section of the entry being registered, a code section memory location field 322 which identifies the memory location at which the programming code section being registered is expected to be loaded, a remedial action field 324 which identifies the remedial action to be taken in the event that modification of the registered programming code section is detected, and a monitor field 326 which indicates whether the registered programming code section is to be monitored. It is appreciated that the number and type of fields of each registry data structure or entry may vary, depending upon the particular application. Upon registering a section of programming code in an entry of a registry table, a determination may be made (block 402) as to whether additional programming code sections are to be registered in the registry table. If so, the additional programming code sections are registered (block 404).

Upon completing the registering of one or more programming code sections in the registry table, a registered code section may be validated (block 412). In one aspect of the present description, a section of programming code registered in a registry table entry may be validated by comparing the section of programming code loaded at a memory location identified by the code section memory location field 322 of the entry to the registered section of programming code expected to be found at that memory location as identified by the code section identification field 320. If the section of programming code loaded at a memory location identified by the code section memory location field 322, matches the registered section of programming code expected to be found at that memory location as identified by the code section identification field 320, the registered code section is validated as unmodified. Accordingly, modification of the baseline version of the section of programming registered in the registry table 310, has not been detected (block 416).

If the validation process of block 412 fails to detect (block 416) a modification of the registered section of programming code, a determination (block 420) may be made as to whether to validate additional code sections registered in the registry table. For example if there remain additional registered code sections which have not yet been validated (block 412) and for which monitoring (field 326, FIG. 3a) has been selected, those additional registered code sections may be validated (block 412) in a manner similar to that described above.

Conversely, if the section of programming code loaded at a memory location identified by the code section memory location field 322, fails to match the registered section of programming code expected to be found at that memory location as identified by the code section identification field 320, the validation process (block 412) for the registered programming code section has detected (block 416) a modification of the baseline version of that section of programming code registered in the registry table 310.

Upon detecting (block 416) a code section modification, remedial action may be taken (block 424). In one embodiment, the particular remedial action taken in response to detection of modification of a registered section of programming code may be user selectable as discussed above in connection with the remedial action field 324 (FIG. 3a) of the registry table. Selectable remedial action options may be selected from a variety of options including logging in a log table an identification of the section of programming code detected to have been modified, halting execution of the programming code section found to have been modified, and restoring the section of programming code detected to have been modified to the baseline version identified by the associated entry of the registry table. Other remedial action options may be available, depending upon the particular application.

In one embodiment, upon detecting (block 416) a code section modification, in addition to taking appropriate remedial action, a determination may be made whether to register the modified section of programming code in the registry table. Registering a modified section of programming code in the registry table may be used to detect whether the modified section of programming code of the software product has been modified by yet another software product. As discussed above, it is recognized that modification of a software product may occur on multiple levels, each level representing a level of modifications by a particular software product. Each level of modifications may in turn be modified by another software product in another level of modification.

A modified section of programming code may be registered (block 432) in the registry table in the same manner as an original baseline version of a section of programming code. Thus, in the illustrated embodiment, a modified section of programming code is registered in the registry table by creating an entry for that modified section of programming code and entering appropriate data in the fields of the entry for that section of programming code. For example, in the registry table 310 (FIG. 3b) the entry 340 for the modified section A5' of programming code in the registry table 310 has a code section identification field 320 which identifies the programming code section (here A5') being registered in the entry 340, a code section memory location field 322 which identifies the memory location (here memory location ML5) at which the programming code section A5' being registered is expected to be loaded, a remedial action field 324 which identifies the remedial action to be taken in the event that yet another modification of the registered modified programming code section A5' is detected, and a monitor field 326 which indicates whether the registered modified programming code section A5' is to be monitored. Again, it is appreciated that the number and type of fields of each registry data structure and entry may vary, depending upon the particular application.

Upon completing the registering of a modified programming code section in the registry table, another registered code section may be validated (block 412) if other registered code sections of the registry table remain to be validated (block 420). Once all the entries of the registry table which have been marked for monitoring in the field 326 have been checked by the validation process (block 412), the modification detection process may terminate (block 436) until the next time the modification detection process is again initiated (block 400). In such a subsequent initiation of the modification detection process, the entry 340 added to the registry table 310 (FIG. 3b) may be checked to validate whether or not the modified programming code section A5' registered in the entry 340 of the registry table, has been modified by yet another software product in another layer of modifications.

Figure 5:
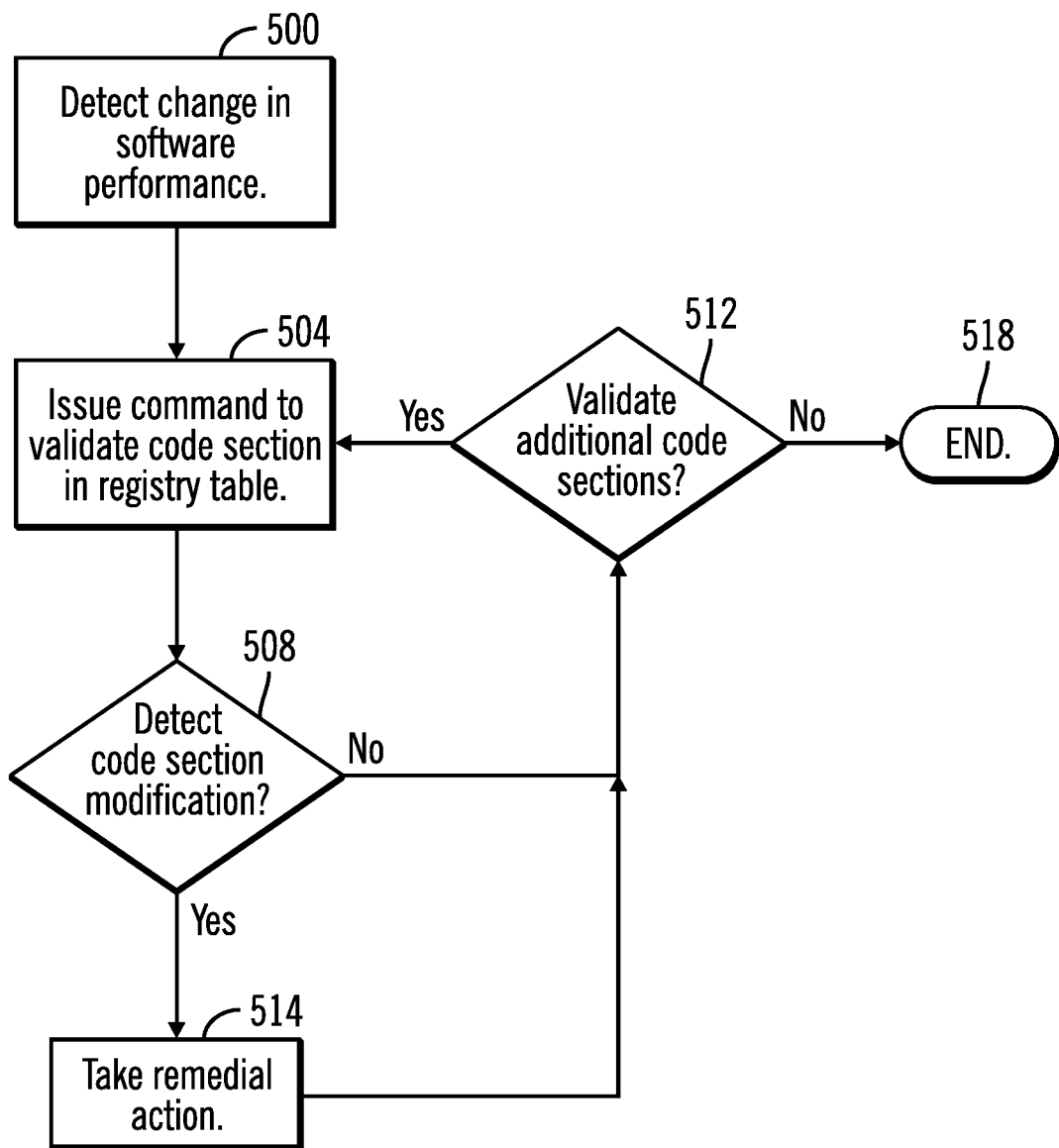
FIG. 5 depicts another example of operations of a processor node for code execution management in accordance with another aspect of the present description.

FIG. 5 is directed to an embodiment in which an on-demand command may be made available to the user through which the user may issue to the system at any time a command to perform an on-demand check of any programming code section registered in the registry table and to report if anything has been modified. For example, if the system or the user monitoring the system detects (block 500) a change in performance of the software product, a command may be issued (block 504) to validate one or more code sections which have been registered in the registry table associated with that software product.

As discussed above, a section of programming code registered in a registry table entry may be validated by comparing the section of programming code loaded at a memory location identified by the code section memory location field 322 of the entry to the registered programming code expected to be found at that memory location as identified by the code section identification field 320. If the section of programming code loaded at a memory location identified by the code section memory location field 322, matches the registered section of programming code expected to be found at that memory location as identified by the code section identification field 320, the registered code section is validated as unmodified. Accordingly, modification of the baseline version of the section of programming code registered in the registry table 310, has not been detected (block 508).

If the validation process of block 504 fails to detect (block 508) a modification of the registered section of programming code, a determination (block 512) may be made as to whether to validate additional code sections registered in the registry table. For example, the on-demand code may identify which sections of programming code registered in the registry table are to be validated. In another embodiment, all registry entries for which monitoring has been selected (field 326, FIG. 3a) may be validated in response to a single on-demand command.

In still another embodiment, registered programming code sections of a particular software product may be selected as a group for validation using the software product key subfield 320a. Thus, the registered programming sections of software product A, for example, may be selected as a group for validation using the product key of the product key subfield 320a for software product A.

In one embodiment all registered programming code sections of the selected program product may be selected for validation as a group overriding the monitor field 326. Thus, the registered programming sections of software product A, for example, may be selected as a group for validation including the code section A4 using the product key of the product key subfield 320a for software product A, notwithstanding that the monitor field 326 for the code section A4 of entry 316 indicates bypassing validation for code section A4.

In another embodiment, the product key subfield 320a and the monitor field 326 may be used in combination to select as a group, the registered programming code sections for which monitoring has been selected as indicated by the monitor field 326 and for which the registered programming sections originate from a particular software product as indicated by the product key subfield 320a. In yet another embodiment, particular registered programming sections may be selected for validation using any combination of criteria including one or more of the product key subfield 320a, the code section key subfield 320b and the monitor field 326. Thus, if there remain additional registered code sections which have not yet been validated (block 512) and for which monitoring has been selected using one or more of the criteria of the fields and subfields of the registry table 310, FIG. 3a), those additional registered code sections may be validated in a manner similar to that described above.

Conversely, if the section of programming code loaded at a memory location identified by the code section memory location field 322, fails to match the registered section of programming code expected to be found at that memory location as identified by the code section identification field 320, the validation process (block 504) for the registered programming code section has detected (block 508) a modification of the baseline version of that section of programming code registered in the registry table 310.

Upon detecting (block 508) a code section modification, remedial action may be taken (block 514) in the manner discussed above. In one embodiment, upon detecting (block 508) a code section modification, in addition to taking appropriate remedial action, a determination may be made whether to register the modified section of programming code in the registry table as discussed above.

Once all the entries of the registry table which have been selected by the command for monitoring or have been marked for monitoring in the field 326, have been checked by the validation process (block 504) of the on-demand command, the modification detection process initiated by the on-demand command may terminate (block 518) until the next time the modification detection process is again initiated by the system or the user.

It is seen from the above, that programming code modification detection can be readily added to a software product by registering selected sections of programming code of the software product in a registry table or other suitable data structure. A modification detection process as described herein can readily detect if a software product has been changed a selected point and time. Moreover, selectable remedial options are provided in the event that a modification is detected.

Figure 6:
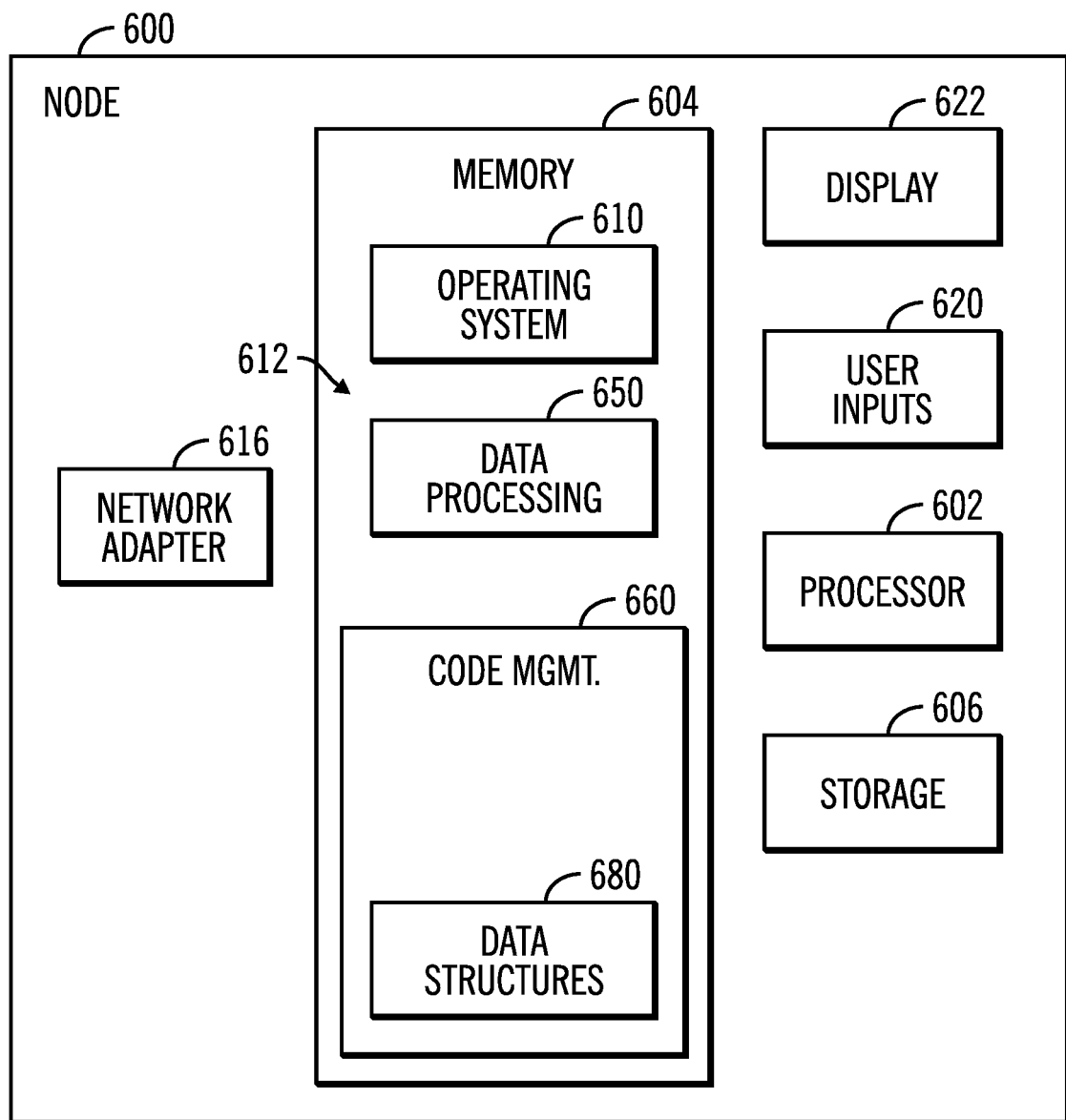
FIG. 6 illustrates an example of a processor node of the computing system of FIG. 1 for use in connection with code execution management in accordance with the present description.

FIG. 6 illustrates one embodiment of a processor node 600 which is representative of the processor nodes 220a, 220b, 222a, 222b, for example, of the distributed computing system 200. The processor node 600 of this example, may implement programming code execution management in accordance with the present description and may comprise any suitable computing device, such as a mainframe, server, personal computer, laptop, handheld computer, telephony device, network appliance, virtualization device, storage controller, etc. The processor node 600 may include a processor 602 (e.g., a microprocessor), a memory 604 (e.g., a volatile memory device), and storage 606 (e.g., a non-volatile storage, such as magnetic disk drives, optical disk drives, a tape drive, etc.). The storage 606 may comprise an internal storage device or an attached or network accessible storage. Programs in the storage 606 are loaded into the memory 604 and executed by the processor 602 as represented by an operating system 610 and programs 612. The processor node 600 further includes a network controller or adapter 616 to enable communication with a network such as the network 248 (FIG. 1), such as an Ethernet, a Fibre Channel Arbitrated Loop, etc. which interconnects the processor nodes of the distributed computing system 200. The network controller or adapter 616 may also enable communication with a network path 276 to a host 250 or with a network path 270 to storage 260.

User input devices 620 provide user input to the processor 602, and may include a keyboard, mouse, pen-stylus, microphone, touch sensitive display screen, or any other suitable activation or input mechanism. Output devices 622 are capable of rendering information transmitted from the processor 602, or other component, such as a display monitor, printer, storage, etc.

In one embodiment, the processor nodes 220 of each of the servers 210, 212 of the distributed computing system 200 perform a primary data processing function such as the functions storing data in and retrieving data from the storage 606. Thus, included in the memory 604 is suitable data processing programming 650 for performing the data processing functions such data storage and retrieval, for example, in disk arrays, for example. Thus, the processor nodes 220 may perform data processing tasks such as data backup, data deduplication, data mining, data capture, data archiving data replication, bandwidth reduced data replication, encryption of data, etc., and typically involve the transfer of large amounts of data between the hosts 250 (FIG. 1) and storage 260.

In accordance with the present description, each processor node 220, 600 further has code execution management programming 660 which may share some or all of the hardware of each such processor node 220, 600 in running the code execution management programming 660, including registry data structures 680 in accordance with the present description. Other features and aspects may be realized, depending upon the particular application. Thus, each processor node 600, 220 may perform other code execution management functions within the distributed node computing system.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
 a processor node detecting whether programming code of a first computer program has been modified by a second computer program including whether a first section of the programming code has been relocated by hooking to another memory address, wherein the modification detecting includes validating the first section of programming code, said validating including comparing a section of programming code actually located at a first memory address at which the first section of programming code is expected to be located absent modification of the first memory address of the first section of the programming code by the second computer program, to the first section of programming code expected to be located at the first memory address absent modification of the first section of programming code by the second computer program, to determine whether the first section of programming code has been relocated away from the first memory address.

2. The method of claim 1 wherein:

the modification detecting further includes:

registering a first section of programming code of the first computer program in a first registry data structure, the registering including:

entering into a first code section entry of the first registry data structure associated with the first computer program, an identification of a first section of programming code of the first computer program; and entering into the first code section entry, a first memory address at which the first section of programming code is expected to be located; and wherein the validating the registered first section of programming code further includes comparing the section of programming code actually located at the first memory address to the first section of programming code identified by the first code section entry of the first registry data structure to determine whether the first section of programming code has been relocated away from the first memory address entered in the first code section entry of the first registry data structure.

3. The method of claim 2 wherein the identification of the first section of programming code of the first computer program entered into the first code section entry of the first registry data structure associated with the first computer program, is a listing of the first section of programming code which is contained within the first code section entry of the first registry data structure associated with the first computer program; and wherein the comparing the sections of programming code includes comparing a listing of the section of programming code actually located at the first memory address to the listing of the first section of programming code contained within the first code section entry of the first registry data structure associated with the first computer program to determine whether the listing of the first section of programming code is actually located at the first memory address entered in the first code section entry of the first registry data structure.

4. The method of claim 2 wherein at least one of the first registry data structure is populated when the first computer program is executed, and the frequency of determining whether the first section of programming code is actually located at the first memory address entered in the first code section entry of the first registry data structure is user selectable.

5. The method of claim 3 wherein the modification detecting detects that the programming code of the first computer program has been modified by the second computer program and wherein the modification by the second computer program is at least one of a redirected call of the first section of programming code, a relocation of the first section of programming code, and a loading of a modified version of the first section of programming code at the first memory location entered in the first code section entry of the first registry data structure.

6. The method of claim 3 wherein the modification detecting detects that the first section of programming code of the first computer program has been modified by the second computer program, the method further comprising:

detecting whether the modified first section of programming code of the first computer program has been modified by a third computer program, wherein the modified computer program modification detecting includes:

registering the modified first section of programming code of the first computer program in the first registry data structure, the modified first section registering including:

entering into a second code section entry of the first registry data structure associated with the first computer program, an identification of the modified first section of programming code of the first computer program; and entering into the second code section entry, the first memory address at which the modified first section of programming code is expected to be located; and validating the registered modified first section of programming code, said modified first section validating including comparing the section of programming code actually located at the first memory address to the modified first section of programming code identified by the second code section entry of the first registry data structure to determine whether the modified first section of programming code is actually located at the first memory address entered in the second code section entry of the first registry data structure.

7. The method of claim 2 further comprising:

taking remedial action upon detecting modification of programming code of the first computer program wherein the remedial action is user selectable for each entry of the first registry data structure and includes at least one of logging in a log table an identification of the section of programming code detected to have been modified, halting execution of the first computer program and restoring the section of programming code detected to have been modified to the version identified by the associated entry of the first registry data structure.

8. The method of claim 2 further comprising detecting a change in the performance of the first computer program and issuing a command to validate selected sections of programming code of the first computer program registered in the first registry data structure.

9. A system, comprising:

a data processing system having at least one processor node, memory including storage, said memory having memory addresses and a registry data structure having entries, and computer programs having programming code; and at least one computer readable storage medium having computer readable program instructions embodied therewith, the program instructions executable by the processor node to cause the data processing system to perform operations, the operations comprising:

detecting whether programming code of a first computer program has been modified by a second computer program including whether a first section of the programming code has been relocated by hooking to another memory address, wherein the modification detecting includes validating the first section of programming code, said validating including comparing a section of programming code actually located at a first memory address at which the first section of programming code is expected to be located absent modification of the first memory address of the first section of the programming code by the second computer program, to the first section of programming code expected to be located at the first memory address absent modification of the first section of programming code by the second computer program to determine whether the first section of programming code has been relocated away from the first memory address.

10. The system of claim 9 wherein:
the modification detecting further includes:
registering a first section of programming code of the first computer program in a first registry data structure, the registering including:
entering into a first code section entry of the first registry data structure associated with the first computer program, an identification of a first section of programming code of the first computer program; and
entering into the first code section entry, a first memory address at which the first section of programming code is expected to be located; and
wherein the validating the registered first section of programming code further includes comparing the section of programming code actually located at the first memory address to the first section of programming code identified by the first code section entry of the first registry data structure to determine whether the first section of programming code has been relocated away from the first memory address entered in the first code section entry of the first registry data structure.

11. The system of claim 10 wherein the identification of the first section of programming code of the first computer program entered into the first code section entry of the first registry data structure associated with the first computer program, is a listing of the first section of programming code which is contained within the first code section entry of the first registry data structure associated with the first computer program; and
wherein the comparing the sections of programming code includes comparing a listing of the section of programming code actually located at the first memory address to the listing of the first section of programming code contained within the first code section entry of the first registry data structure associated with the first computer program to determine whether the listing of the first section of programming code is actually located at the first memory address entered in the first code section entry of the first registry data structure.

12. The system of claim 10 wherein at least one of the first registry data structure is populated when the first computer program is executed, and the frequency of determining whether the first section of programming code is actually located at the first memory address entered in the first code section entry of the first registry data structure is user selectable.

13. The system of claim 11 wherein the modification detecting detects that the programming code of the first computer program has been modified by the second computer program and wherein the modification by the second computer program is at least one of a redirected call of the first section of programming code, a relocation of the first section of programming code, and a loading of a modified version of the first section of programming code at the first memory location entered in the first code section entry of the first registry data structure.

14. The system of claim 11 wherein the modification detecting detects that the first section of programming code of the first computer program has been modified by the second computer program, the operations further comprising:
detecting whether the modified first section of programming code of the first computer program has been modified by a third computer program, wherein the modified computer program modification detecting includes:
registering the modified first section of programming code of the first computer program in the first registry data structure, the modified first section registering including:
entering into a second code section entry of the first registry data structure associated with the first computer program, an identification of the modified first section of programming code of the first computer program; and
entering into the second code section entry, the first memory address at which the modified first section of programming code is expected to be located; and
validating the registered modified first section of programming code, said modified first section validating including comparing the section of programming code actually located at the first memory address to the modified first section of programming code identified by the second code section entry of the first registry data structure to determine whether the modified first section of programming code is actually located at the first memory address entered in the second code section entry of the first registry data structure.

15. The system of claim 10 wherein the operations further comprise:
taking remedial action upon detecting modification of programming code of the first computer program wherein the remedial action is user selectable for each entry of the first registry data structure and includes at least one of logging in a log table an identification of the section of programming code detected to have been modified, halting execution of the first computer program and restoring the section of programming code detected to have been modified to the version identified by the associated entry of the first registry data structure.

16. The system of claim 10 wherein the operations comprise detecting a change in the performance of the first computer program and issuing a command to validate selected sections of programming code of the first computer program registered in the first registry data structure.

17. A computer program product for a data processing system having at least one processor, the product comprising at least one computer readable storage medium having computer readable program instructions embodied therewith, the program instructions executable by a processor to cause the data processing system to perform operations, the operations comprising:
detecting whether programming code of a first computer program has been modified by a second computer program including whether a first section of the programming code has been relocated by hooking to another memory address, wherein the modification detecting includes validating the first section of programming code, said validating including comparing a section of programming code actually located at a first memory address at which the first section of programming code is expected to be located absent modification of the first memory address of the first section of the programming code by the second computer program, to the first section of programming code expected to be located at the first memory address absent modification of the first section of programming code by the second computer program, to determine whether the first section of programming code has been relocated away from the first memory address.

18. The computer program product of claim 17 wherein: the modification detecting further includes:
registering a first section of programming code of the first computer program in a first registry data structure, the registering including:
entering into a first code section entry of the first registry data structure associated with the first computer program, an identification of a first section of programming code of the first computer program; and
entering into the first code section entry, a first memory address at which the first section of programming code is expected to be located; and
wherein the validating the registered first section of programming code further includes comparing the section of programming code actually located at the first memory address to the first section of programming code identified by the first code section entry of the first registry data structure to determine whether the first section of programming code has been relocated away from the first memory address entered in the first code section entry of the first registry data structure.

19. The computer program product of claim 18 wherein the identification of the first section of programming code of the first computer program entered into the first code section entry of the first registry data structure associated with the first computer program, is a listing of the first section of programming code which is contained within the first code section entry of the first registry data structure associated with the first computer program; and
wherein the comparing the sections of programming code includes comparing a listing of the section of programming code actually located at the first memory address to the listing of the first section of programming code contained within the first code section entry of the first registry data structure associated with the first computer program to determine whether the listing of the first section of programming code is actually located at the first memory address entered in the first code section entry of the first registry data structure.

20. The computer program product of claim 18 wherein at least one of the first registry data structure is populated when the first computer program is executed, and the frequency of determining whether the first section of programming code is actually located at the first memory address entered in the first code section entry of the first registry data structure is user selectable.

21. The computer program product of claim 19 wherein the modification detecting detects that the programming code of the first computer program has been modified by the second computer program and wherein the modification by the second computer program is at least one of a redirected call of the first section of programming code, a relocation of the first section of programming code, and a loading of a modified version of the first section of programming code at the first memory location entered in the first code section entry of the first registry data structure.

22. The computer program product of claim 19 wherein the modification detecting detects that the first section of programming code of the first computer program has been modified by the second computer program, the operations further comprising:
detecting whether the modified first section of programming code of the first computer program has been modified by a third computer program, wherein the modified computer program modification detecting includes:
registering the modified first section of programming code of the first computer program in the first registry data structure, the modified first section registering including:
entering into a second code section entry of the first registry data structure associated with the first computer program, an identification of the modified first section of programming code of the first computer program; and
entering into the second code section entry, the first memory address at which the modified first section of programming code is expected to be located; and
validating the registered modified first section of programming code, said modified first section validating including comparing the section of programming code actually located at the first memory address to the modified first section of programming code identified by the second code section entry of the first registry data structure to determine whether the modified first section of programming code is actually located at the first memory address entered in the second code section entry of the first registry data structure.

23. The computer program product of claim 18 wherein the operations further comprise:
taking remedial action upon detecting modification of programming code of the first computer program wherein the remedial action is user selectable for each entry of the first registry data structure and includes at least one of logging in a log table an identification of the section of programming code detected to have been modified, halting execution of the first computer program and restoring the section of programming code detected to have been modified to the version identified by the associated entry of the first registry data structure.

24. The computer program product of claim 18 wherein the operations comprise detecting a change in the performance of the first computer program and issuing a command to validate selected sections of programming code of the first computer program registered in the first registry data structure.

* * * * *